Patented Apr. 11, 1944

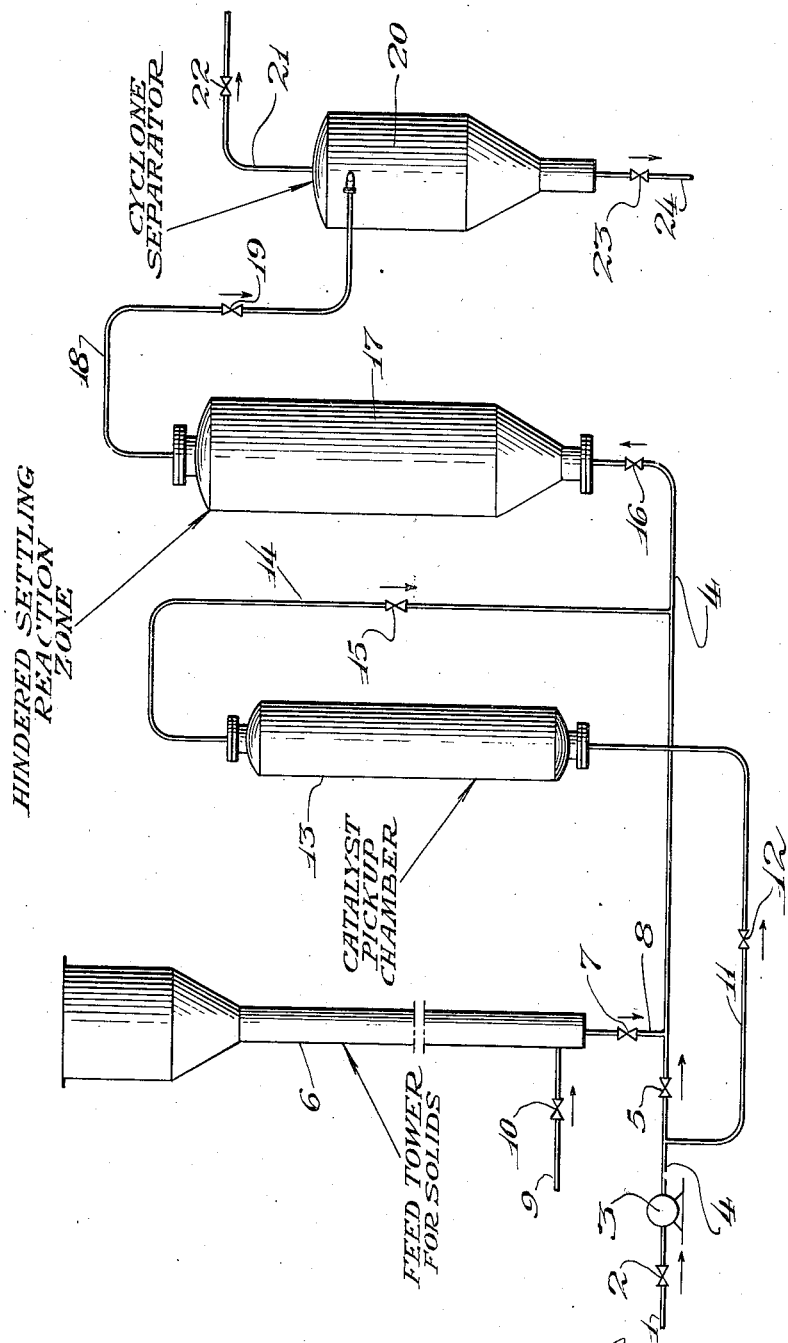

2,346,294

UNITED STATES PATENT OFFICE 2,346,294

METHOD OF CATALYSIS

Joseph D. Danforth, Chicago, Ill., assignor to Universal Oil Products Company, Chicago, Ill., a corporation of Delaware Application July 30, 1941, Serial No. 404,603

14 Claims. (Cl. 260—683.4)

This invention relates to a novel method of catalysis. More specifically the invention is concerned with a process for effecting chemical reactions in the presence of a catalyst introduced by means of a fluid carrying medium to a reaction zone containing a catalyst supporting material freely dispersed throughout the reactants.

In my co-pending application Serial No. 370,323, filed December 16, 1940, I have described a process for effecting hydrocarbon reactions in the presence of a catalyst introduced by means of a fluid carrying medium to a reaction zone containing a packing material. In said process the packing material was in the form of a fixed bed and was either adsorptive or non-adsorptive. However, the use of an adsorptive support in a fixed bed process has a certain disadvantage in that any adsorptive surface tends to become fouled with contaminating materials and the surface no longer adsorbs the fresh catalyst entering the reaction zone. When this occurs it is necessary to reactivate the adsorptive surface in some manner, and this usually means, in a continuous process, that periodically a reactor must be withdrawn from service for reactivation. This cycle of operation necessitates more rigid control and requires the installation of additional equipment to carry out the reactivation of the adsorptive support. In the process of the present invention I continuously add to and remove from the reaction zone portions of the adsorptive solid supporting material and also separately add a catalyst to the stream of reactants. In the reaction zone the catalyst is adsorbed or deposited on the surface of the freely dispersed supporting material.

One specific embodiment of the present invention comprises passing a stream of fluid reactants to a hindered settling type reactor wherein the stream of reactants passes upwardly through a bed of freely dispersed solid catalyst-supporting particles at such a rate that the catalyst particles are maintained in a state of constant agitation but the major portion of said particles are not carried out of the reaction zone, continuously adding a relatively small proportion of inert solid adsorptive particles to the reactants prior to the reaction zone, separately adding a stream of fluid catalysts to the stream of reactants prior to the reaction zone, controlling the addition of the fluid catalyst so that substantially all of the catalyst is adsorbed on the surface of the solid adsorptive particles in the reaction zone, withdrawing a stream of reaction products from the reaction zone together with a small proportion of the solid particles supporting partially spent catalyst, and separating said solid particles from said reaction products in a separation zone.

A hindered settling type reactor as mentioned in this specification indicates any type of reactor in which a stream of fluid reactants pass upwardly through a bed of finely divided solid particles at such a rate that said particles are maintained in a state of agitation but a major proportion of which are not carried out of the reaction zone with the reactants.

By the process of the present invention catalytic material such as aluminum chloride may be introduced to a reaction zone by means of one or more fluids being charged thereto. Thus either a portion or all of the reactants or a fluid such as gaseous hydrocarbons which is substantially inert toward the catalyst may be passed through a chamber containing the catalyst at a temperature and pressure which enables the catalyst to be vaporized or dissolved in a sufficient amount. The resulting catalyst laden stream of fluid is then mixed with the rest of the charge to the reaction zone comprising reactants and/or a minor proportion of finely divided substantially inert adsorptive solid and the mixture is admitted to said reaction zone which contains a substantial proportion of said finely divided inert solid freely dispersed therein. The freshly added catalyst deposits on the surface of said finely divided inert solid to form a supported aluminum chloride catalyst. A small amount of hydrogen chloride is also preferably added to the reactant stream to activate the aluminum chloride catalyst. Since the adsorptive surface of the inert support will eventually become inactive, it will be necessary to remove and reactivate a portion of the finely divided particles. This is most easily accomplished by regulating the flow in the reactor so as to carry a portion of the finely divided supported catalyst out of the reactor with the conversion products. This partially spent catalyst is separated from the conversion products and then the inert support may be reactivated by any one of several methods.

One method of reactivation involves heating the spent catalyst to drive off volatile matter including unused catalyst and subsequently oxidizing the carbon deposit left after the devolatilization in a stream of hot oxygen-containing gases.

Another method of reactivating the inert supporting material is to contact the material with a stream of live steam. This steaming operation may also conveniently be carried out in a hindered settling type of contactor. After reactivation of the adsorptive surface of the inert supporting material it may be again introduced to the reactant stream prior to the reaction zone or directly to the reaction zone. The surface of the finely divided supporting material need not be adsorptive in all cases. For instance, in the alkylation of iso-paraffins with olefins using an aluminum chloride catalyst, the catalyst carrier need be only some surface upon which an aluminum chloride complex may deposit.

Other volatile catalysts that may be used in the method of this invention include boron fluoride and hydrogen fluoride. The boron fluoride may be adsorbed on such supports as activated char, alumina, silica, acid treated clays, etc. The hydrogen fluoride will necessarily be supported on an unreactive material such as activated char. The above mentioned catalysts and supports are not necessarily equivalent in their suitability for use in the process of this invention.

The addition of volatile catalysts to the reactants separately from the finely divided supporting material has a distinct advantage. If the catalysts were adsorbed on the solid supporting material prior to their introduction to the reactant stream, the amount of catalyst introduced to the system would be limited to the amount of catalyst adsorbed on the portion of finely divided solid particles being added to the reactants. It would not be possible to renew the catalyst layer on the surface of the large quantity of finely divided catalyst suspended in the reaction zone. The volatile catalyst adsorbed on the surface of the support is not in equilibrium with the catalyst in the fluid phase of the reactants and, therefore, if no method of adding fresh catalyst is provided the catalyst adsorbing surface of the support in the reaction zone will gradually become impoverished. In the process of this invention the catalyst is introduced to the reaction zone separately from the adsorptive supporting material and therefore can be introduced in any amount that is necessary to maintain the activity of the supported catalyst at a desired level.

In a hindered settling catalytic process the catalyst or, as in the case of this invention, the catalyst and its support is usually added with the charge. The ratio of the amount of finely divided solid particles to the amount of reactants in the charge to the reaction zone will vary widely depending on the life of the solid catalytic material before reactivation is necessary. Generally, however, the above-mentioned ratio will be much less than the corresponding ratio in the reaction zone. The mixture of reactants, catalysts, and catalyst support is introduced to the reaction zone where the reactants pass upwardly through a bed of freely dispersed finely divided solid particles carrying the adsorbed catalyst. The concentration of finely divided solid particles in the reaction zone will also vary depending upon the rate of flow, particle size, etc., but in any case will be much higher than in the incoming stream of reactants. This higher concentration is possible because the solid catalyst-supporting particles which are more dense than the reactants tend to settle out against the upward flowing stream of reactants. In the stream of reactants prior to the reaction zone the velocity is kept high enough to prevent any appreciable settling out of the solid particles. The concentration of the solid catalyst supporting particles in the reaction zone may be very high and is only limited by the requirement that the material remain in a fluid state.

The stream of reaction products leaving the reactor will carry approximately the same amount of finely divided solids as the entering stream of reactants. This finely divided solid material which will have a certain amount of active and/or spent catalyst adsorbed on its surface will be separated from the conversion products ordinarily by some mechanical or electrical precipitation method and may then be reactivated in some suitable manner such as by oxidation, hydrogenation, steaming, washing, etc. and returned to the stream of reactants entering the reactor. It is not always necessary to remove all of the adsorbed catalytic material from the finely divided adsorbent solid particles in the reactivation step as, in some instances, a partial reactivation of the adsorptive surface will be sufficient. The recycled solid adsorptive particles will in this case contain some active catalyst adsorbed thereon prior to contact with the fresh catalyst in the reactant stream entering the reaction zone.

The process of this invention may be carried out in either the liquid or vapor phase. In the liquid phase the catalyst may be introduced either as a solution of the catalyst in the liquid charge, for instance, a solution of aluminum chloride in a liquid hydrocarbon, a separate immiscible liquid or a gaseous material composed in part or entirely of vaporized catalyst. If the reactants are in the vapor phase the catalyst will usually also be in the vapor phase, although the invention is not so limited.

The accompanying drawing diagrammatically illustrates one way in which this invention may be employed in a catalytic process.

Referring to the drawing, a stream of fluid reactants enters through line 1, valve 2, and pump 3 into line 4 where it is separated into two streams. One stream passes through valve 5 after which the finely divided inert adsorptive particles are added to the stream. The finely divided inert particles are stored in a feed tower 6 which is of sufficient height to provide the necessary pressure to force them through valve 7 and line 8 into the reactant stream in line 4. In order to maintain the solid particles in standpipe 6 in a fluid state an inert fluid such as gaseous nitrogen is introduced through line 9 and valve 10 into the bottom of standpipe 6. The other portion of the stream of reactants passes through line 11 and valve 12 to catalyst pickup chamber 13. In this chamber the reactant stream picks up a portion of the catalyst and the resulting catalyst laden stream of reactants flows through line 14 and valve 15 to be combined with the other reactant stream containing finely divided adsorbent particles in line 4. The combined reactant streams flow through line 4 and valve 16 to reaction zone 17. In reaction zone 17 a high concentration of finely divided adsorbent particles is attained by an increase in the cross-section of the flowing reactant stream sufficient to allow the solid particles to settle against the upwardly flowing stream of reactants. The catalyst added to the stream in pickup chamber 13 becomes adsorbed on the finely divided adsorptive particles in line 4 and in reaction zone 17. The reaction products and a portion of the finely divided particles with adsorbed catalyst pass through line 18 and valve 19 to cyclone separator 20 wherein the fluid reaction products and the finely divided solid particles are separated. The reaction products are withdrawn through line 21 and valve 22 and the finely divided solid particles settle out and are withdrawn through valve 23 and line 24.

The catalytic isomerization of paraffin hydrocarbons to produce branched chain hydrocarbons or more highly branched chain hydrocarbons with an aluminum chloride catalyst may be accomplished advantageously by employing the process of this invention. The paraffin charge may be either butane or normally liquid paraffins such as pentane, hexane or heptane or may even be a low boiling gasoline fraction. The reaction may be carried out either in the liquid or vapor phase at a temperature between 100° and 500° F.

Suitable powdered adsorbents include alumina, bauxite, activated char, acid treated clays, etc. All or a portion of the charge may pass through an aluminum chloride pickup chamber containing granular aluminum chloride. The catalyst laden stream is then combined with the stream containing the finely divided adsorbent and the combined streams passed to the reaction zone. A small amount of dry hydrogen chloride is also preferably added to the reaction zone to activate the aluminum chloride catalyst.

The catalytic alkylation of iso-paraffins with olefins to produce saturated branched chain hydrocarbons of high octane rating may also be carried out by employing the method of catalysis as shown by this invention. An aluminum chloride-hydrogen chloride catalyst may be used in conjunction with various powdered supports such as alumina, activated char, porcelain, clay, quartz, etc. Another catalyst which may be used for alkylation is hydrogen fluoride. This catalyst is a liquid boiling at about 20° C. under atmospheric pressure. In the process of this invention this catalyst may be introduced to the process in either the liquid or vapor phase and may be used in conjunction with a non-reactive finely divided supporting material such as activated char. The above alkylation processes may be carried out using the normal or superatmospheric pressures and at temperatures of about 0° F. to about 250° F.

Other processes which may use the method of catalysis as shown by this invention will include the catalytic cracking of hydrocarbons using either an aluminum chloride catalyst or a boron fluoride catalyst and a suitable inert supporting material or the catalytic reforming of a gasoline or naphtha employing one of these catalysts.

The following illustrative example is given to indicate how the present invention may be applied to an isomerization process:

*Example*

A stream of liquid normal butane charging stock heated to 180° F., is divided into equal portions. To one stream is added approximately 4% by weight of finely divided alumina, while the other stream is passed through a chamber containing granular aluminum chloride which dissolves in the charging stock. The aluminum chloride-containing stream will contain approximately 1% aluminum chloride by weight. The two streams of charging stock are then combined and directed to a reaction zone where the combined stream containing aluminum chloride, finely divided alumina, and normal butane is passed upwardly through a freely dispersed bed of finely divided alumina supporting aluminum chloride catalyst. The ratio of finely divided solids to reactants in the reaction zone is greater than one.

The reaction products carrying a small proportion of finely divided supported catalyst, are withdrawn to a separator where the solid particles settle out. The reaction products contain 47% isobutane and the remainder essentially normal butane.

While the foregoing specification and illustrations are indicative of the character of the invention, it is not intended that the broad nature of the invention should be limited by the specific applications indicated therein.

I claim as my invention:

1. In a process for effecting chemical reaction wherein a stream of reactants is passed through a reaction zone containing solid particles maintained in a state of motion in the reaction zone, the method which comprises introducing an additional quantity of said particles to the reaction zone by adding the same to the reactant stream being supplied to said zone, simultaneously introducing to the reaction zone an unsupported catalyst for said reaction, and depositing the catalyst on the solid particles within the reaction zone.

2. The process as defined in claim 1 further characterized in that said unsupported catalyst is introduced to the reaction zone with a portion of the reactants being supplied to the reaction zone.

3. In a process for effecting chemical reaction wherein a stream of reactants is passed through a reaction zone containing freely dispersed solid particles maintained in a state of agitation in the reaction zone, the method which comprises dispersing an additional quantity of said particles in a portion of the reactants to be supplied to the reaction zone, dispersing a catalyst for said reaction in another portion of the reactants, simultaneously introducing said portions of the reactants to the reaction zone, depositing the catalyst on the solid particles within the reaction zone, and removing from said zone a stream of reaction products containing an amount of said particles which is relatively small with respect to that present in the reaction zone.

4. The process as defined in claim 1 further characterized in that said particles are adsorptive and the catalyst deposited thereon by adsorption.

5. The process as defined in claim 3 further characterized in that said particles are adsorptive and the catalyst deposited thereon by adsorption.

6. In the conversion of hydrocarbons wherein a stream of hydrocarbon reactants is passed through a reaction zone containing solid particles maintained in a state of motion in the reaction zone, the method which comprises introducing an additional quantity of said particles to the reaction zone by adding the same to the hydrocarbon reactant stream being supplied to said zone, simultaneously introducing to the reaction zone an unsupported catalyst for the conversion reaction, and depositing the catalyst on the solid particles within the reaction zone.

7. The process as defined in claim 6 further characterized in that said unsupported catalyst is introduced to the reaction zone with a portion of the reactants being supplied to the reaction zone.

8. In the conversion of hydrocarbons wherein a stream of hydrocarbon reactants is passed through a reaction zone containing freely dispersed, solid particles maintained in a state of agitation in the reaction zone, the method which comprises dispersing an additional quantity of said particles in a portion of the hydrocarbon reactants, passing another portion of the reactants through a body of aluminum chloride to disperse aluminum chloride therein, simultaneously introducing said portions of the reactants to the reaction zone and therein depositing the aluminum chloride on the solid particles.

9. In the conversion of hydrocarbons in a reaction zone containing finely divided solid particles maintained in a state of motion within the reaction zone, the method which comprises dispersing an additional quantity of said particles in a portion of the hydrocarbon reactants to be resupplied to the reaction zone, dispersing a catalyst for said reaction in another portion of the reactants, simultaneously introducing said portions of the reactants to the reaction zone, depositing the catalyst on the solid particles within the reaction zone, and removing from said zone a stream of reaction products containing an amount of said particles which is relatively small with respect to that present in the reaction zone.

10. The method as defined in claim 6 further characterized in that said catalyst comprises an aluminum halide.

11. In the conversion of hydrocarbons in a reaction zone containing finely divided solid particles maintained in a state of motion within the reaction zone, the method which comprises dissolving an aluminum halide in a liquid portion of the hydrocarbon reactants to be supplied to said zone, adding finely divided solid particles to another portion of the reactants to be supplied to the reaction zone, simultaneously introducing said portions of the reactants to said zone and depositing the aluminum halide on the solid particles within the reaction zone.

12. In the conversion of hydrocarbons in a reaction zone containing finely divided solid particles maintained in a state of motion within the reaction zone, the method which comprises adding finely divided solid particles to a hydrocarbon reactant stream to be supplied to the reaction zone, then adding an unsupported catalyst for the conversion reaction to said stream and promptly thereafter introducing the composite stream to the reaction zone, and depositing the catalyst on the solid particles within said zone.

13. In the alkylation of an alkylatable hydrocarbon with an olefinic hydrocarbon in a reaction zone containing finely divided solid particles maintained in a state of motion within the reaction zone, the method which comprises introducing an additional quantity of said particles to the reaction zone by adding the same to a stream of hydrocarbon reactants being supplied to said zone, simultaneously introducing unsupported aluminum chloride to the reaction zone and depositing the aluminum chloride on the solid particles within said zone.

14. In the isomerization of paraffinic hydrocarbons in a reaction zone containing finely divided solid particles maintained in a state of motion within the reaction zone, the method which comprises introducing an additional quantity of said particles to the reaction zone by adding the same to a stream of paraffinic hydrocarbons being supplied to said zone, simultaneously introducing unsupported aluminum chloride to the reaction zone and depositing the aluminum chloride on the solid particles within said zone.

JOSEPH D. DANFORTH.